(12) United States Patent
Otto

(10) Patent No.: US 6,442,240 B1
(45) Date of Patent: Aug. 27, 2002

(54) HOSTAGE NEGOTIATION SYSTEM

(75) Inventor: Kevin L. Otto, Milwaukee, WI (US)

(73) Assignee: Professional Safety, Inc., Milwaukee, WI (US)

( * ) Notice: Subject to any disclaimer, the term of this patent is extended or adjusted under 35 U.S.C. 154(b) by 0 days.

(21) Appl. No.: 09/411,410

(22) Filed: Oct. 1, 1999

Related U.S. Application Data

(60) Provisional application No. 60/102,916, filed on Oct. 2, 1998.

(51) Int. Cl.[7] .......................... H04M 11/04; H04N 7/14
(52) U.S. Cl. ...................... 379/37; 348/14.05; 348/151
(58) Field of Search .......................... 348/14.01–14.03, 348/14.05, 14.07, 14.14, 143, 151, 153, 158–159; 379/37; 340/521, 540, 573.1, 573.4

(56) References Cited

U.S. PATENT DOCUMENTS

| | | | |
|---|---|---|---|
| 4,485,400 A | * 11/1984 | Lemelson et al. | ........ 348/14.01 |
| 4,881,135 A | * 11/1989 | Heilweil | ...................... 348/151 |
| 5,027,104 A | *  6/1991 | Reid | ........................... 340/426 |
| 6,064,430 A | *  5/2000 | Lefkowitz | ................... 348/151 |
| 6,094,213 A | *  7/2000 | Mun et al. | ............... 348/14.05 |

FOREIGN PATENT DOCUMENTS

| | | | | |
|---|---|---|---|---|
| DE | 3327076 A1 | * | 1/1985 | ........... B64D/45/00 |
| JP | 09-002399 A | * | 1/1997 | ............. H04N/7/18 |

\* cited by examiner

*Primary Examiner*—Curtis Kuntz
*Assistant Examiner*—George Eng
(74) *Attorney, Agent, or Firm*—Andrus, Sceales, Starke & Sawall, LLP

(57) ABSTRACT

A hostage negotiation system including a throw module and a command unit connected by a communication cable. The throw module includes at least one covert video camera hidden from view. The covert video camera provides a video signal to the command unit showing the current conditions that exist in the immediate area surrounding the throw module. The throw module further includes a covert microphone hidden within the throw module that transmits an audio signal including the sounds occurring the immediate vicinity of the throw module. The command unit receives the covert audio and covert video signals from the throw module and outputs the signals to a video monitor or other display device. Alternatively, the throw module can include a plurality of covert video cameras to provide a nearly 360° view of the area surrounding the throw module. In a system having multiple covert video cameras, the command unit includes a camera selector that allows a law enforcement agent to select between the various camera views.

19 Claims, 3 Drawing Sheets

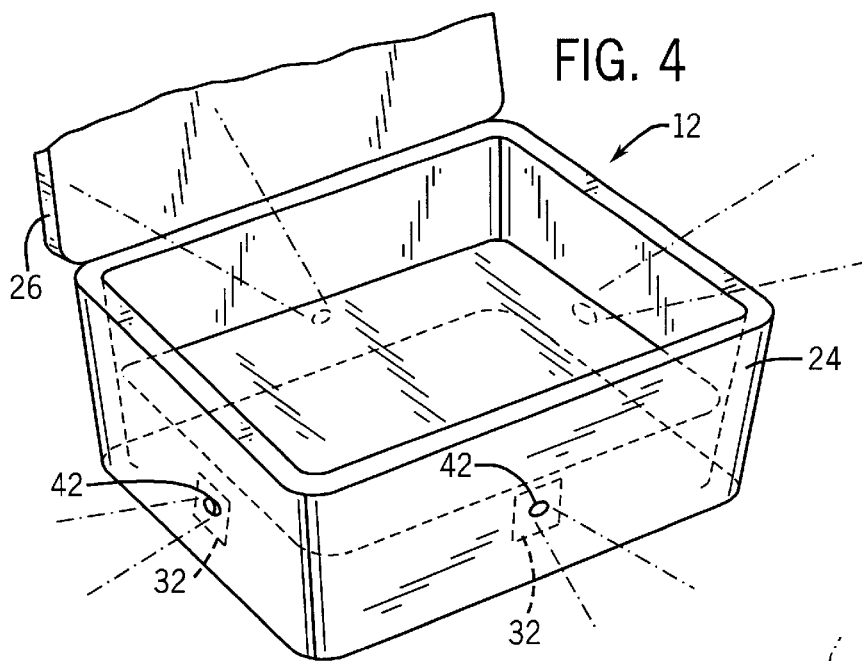
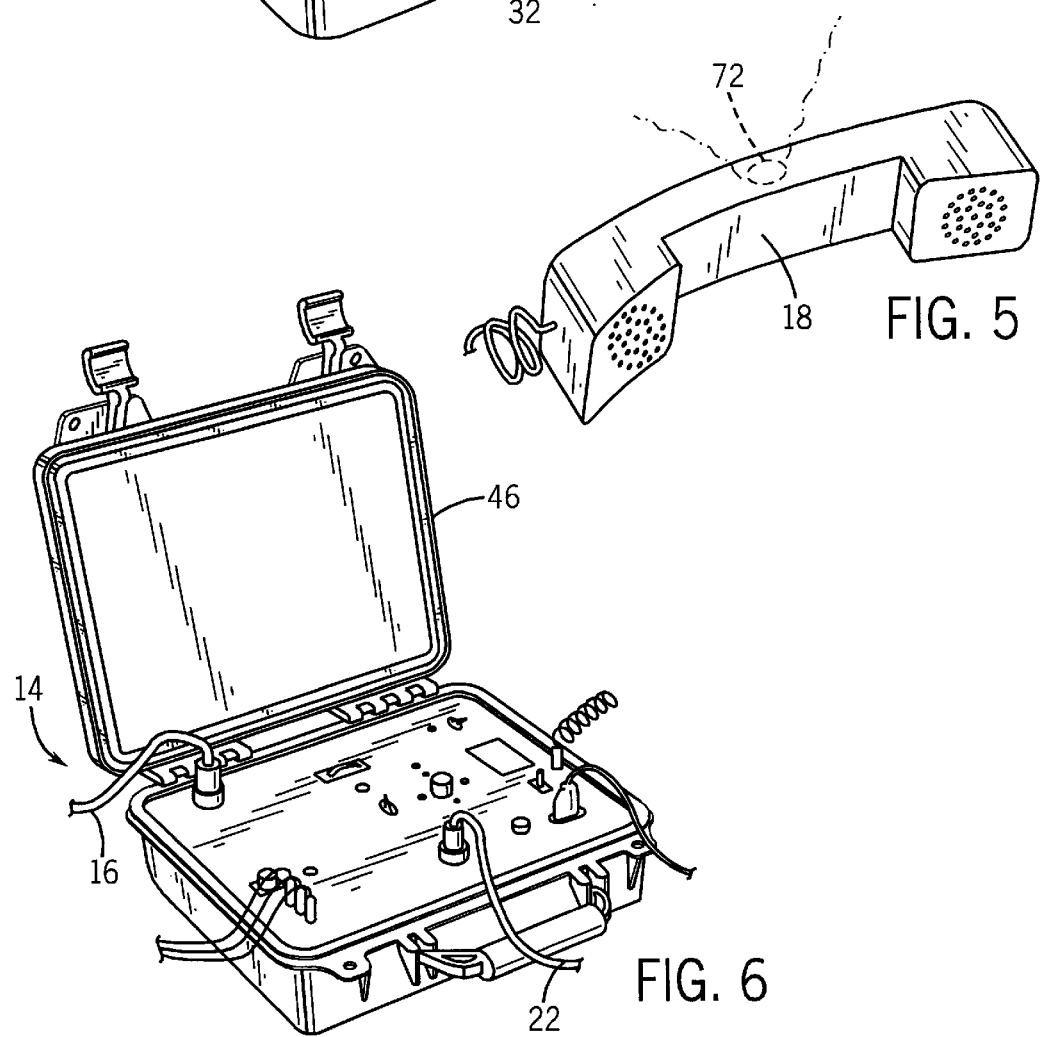
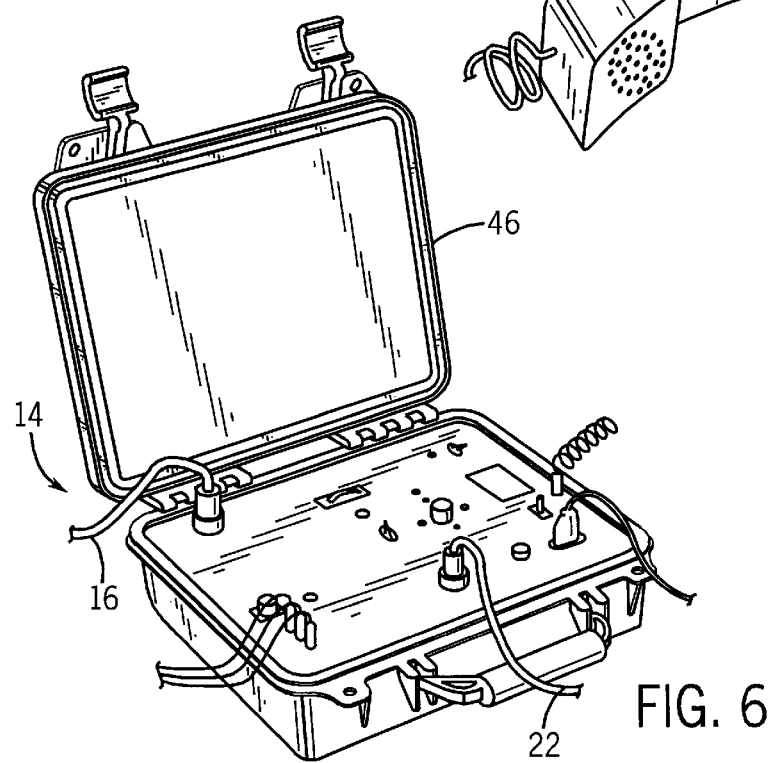

HOSTAGE NEGOTIATION SYSTEM

CROSS REFERENCE TO RELATED APPLICATION

This application is based on and claims priority from provisional patent application Serial No. 60/102,916 filed on Oct. 2, 1998.

BACKGROUND AND SUMMARY OF THE INVENTION

The present invention relates to a hostage negotiation system to provide secure communication between a law enforcement agent and an extortionist. More specifically, the invention relates to a hostage negotiation system including numerous covert features to provide additional information to the law enforcement agent.

Law enforcement agencies are frequently confronted with situations in which an extortionist has barricaded himself in a particular location and it is impractical for the police to enter that location for an arrest without risking the safety of hostages or those in the immediate vicinity. In this type of situation, it is oftentimes necessary for the law enforcement agency to communicate with the extortionist in order to determine the extortionist's demands and requests.

In the past, many types of negotiation units have been used in connection with existing telephone wires to speak with the extortionist. In these types of situations, the law enforcement agency typically taps into the existing phone wires and the extortionist uses the telephone located in the building in which the hostages are being held. However, this type of hostage negotiation unit has several drawbacks, in that the communication with the extortionist may not be secure or there may not be an existing telephone in the building in which hostages are being held.

To address several of these problems, direct connected hostage negotiation systems including two telephone handsets hard wired together are used. In this type of system, one of the handsets is thrown into the building, while the second handset is retained by the law enforcement agency. Through this hard wire connection, the law enforcement agency can contact and communicate with the extortionist holding the hostages.

While this type of system has worked reasonably well, it is desired to enhance the hostage negotiation system to provide the law enforcement agency with additional information to enhance the position of the law enforcement agency in any hostage negotiation that may occur.

It is therefore a feature of the present invention to provide a hostage negotiation system having a command unit used by the law enforcement agencies that is hard wired to a throw module to be used by the extortionist. It is a further object of the invention to provide a hostage negotiation system that includes at least one covert video camera in the throw module to provide a video feed to the command unit. It is a further object of the invention to include a plurality of covert video cameras positioned in the throw module to allow law enforcement agencies to see in any direction from the throw module. It is a further object of the invention to include a covert microphone in the throw module such that law enforcement agencies at the command unit can receive audio signals from within the hostage situation without the extortionist's knowledge. It is an additional object of the invention to provide a hostage negotiation system in which the command unit includes a computer interface that allows the hostage negotiation system to link to a computer mainframe, such as a known extortionist database.

It is a further object of the invention to provide a hostage negotiation system having an output terminal on the command unit that allows the command unit to print video images taken by the throw module. It is a further object of the invention to provide a hostage negotiation system having the capability to transmit video and audio signals from the throw module to the command unit by radio frequency, thereby eliminating the hard wire connection.

Further, it is an object of the invention to provide a covert infrared emitter contained in the handset of the throw module to give the law enforcement agency the ability to view covert video even in complete darkness. It is an additional object of the invention to include auxiliary headset connector jacks in the command unit that allows additional handsets or headsets to be connected to the command unit to allow others to monitor and/or participate in the negotiations. Still further, it is an object of the invention to include interpreter software within the command unit such that audio signals received from and sent to the throw module can be translated into different languages. It is still a further feature of the invention to incorporate a satellite link into the hostage negotiation unit to allow law enforcement agencies to link to a global positioning system and link into cellular phone and other communication methods.

It is a further object of the invention to include a locking device on the lid of the throw module, thereby preventing the extortionist from closing the throw module once it is opened. It is an additional object of the invention to include an intoxication meter within the handset of the throw module such that the intoxication meter can analyze the blood alcohol content of the extortionist and relay the information to the command module. It is a further object of the invention to include a pulse monitor within the handset of the throw module such that the law enforcement agencies can determine the relative excitement level of the extortionist. Further, it is an object of the invention to include an audio and/or video tape recorder within the command unit such that audio images received from the throw module can be recorded. Further, it is an additional object of the invention to include a video monitor incorporated directly into the command unit such that law enforcement officers can immediately view the covert video received from the throw module. Further, it is an object of the present invention to provide the possibility of connecting the command unit to existing land lines such that a third party can communicate to the handset on the throw module.

It should be understood that the numerous features identified above can be incorporated in an almost unlimited number of combinations within the hostage negotiation system, based on the desired feature required by the law enforcement agency using the unit. Additionally, it is contemplated that all of the above-identified features could be incorporated into a single hostage negotiation system suitable for use by any type of law enforcement agency. Finally, it should be understood that although the system of the invention is described as being used in a hostage negotiation situation, it could also be used in any type of crisis situation, such as with a suicidal person.

Various other features, objects and advantages of the invention will be made apparent from the following description taken together with the drawings.

SUMMARY OF THE INVENTION

The present invention is a hostage negotiation system that allows a law enforcement agency to securely communicate with an extortionist. The hostage negotiation system includes a throw module connected to a command unit by a communication cable. The throw module of the hostage negotiation system includes a communication device, such as a telephone handset that allows the extortionist to speak to a law enforcement agent positioned near the command unit through the self-contained communication system.

The throw module includes a rugged outer casing having a main body portion and a cover. The telephone handset is contained within the throw module when the cover is closed.

A covert video camera and a covert microphone are concealed behind a face plate attached to the cover of the throw module. The face plate includes a plurality of holes to disguise the location of both the covert video camera and the covert microphone. The covert video camera and the covert microphone transmit video and audio signals, respectively, to the command unit through the communication cable.

In addition to the covert video camera mounted either within the cover or the inside of the main body of the throw module, the throw module preferably includes several additional covert video cameras positioned to view outward from the side walls of the main body of the outer casing. The additional covert video cameras allow the law enforcement agency to have a nearly 360° view of the area immediately surrounding the throw module.

The command unit of the hostage negotiation system includes a control panel that allows the law enforcement agency to control the various functions of the hostage negotiation system. The control panel of the command unit includes a covert video jack and a covert audio jack such that the covert audio and video signals can be output to an external monitor. Through the external monitor, the law enforcement agency can monitor the immediate area surrounding the throw module without the extortionist's knowledge. Additionally, a communication port allows others besides the primary negotiator to listen to the conversation between the negotiator and the extortionist.

The command unit further includes a conventional telephone dialing pad, a telephone handset, and output connection such that the command unit can be connected to conventional commercial telephone wires and act as a conventional telephone. In this manner, the command unit can be used to communicate with the extortionist through standard telephone lines.

In addition to the standard features discussed above, the hostage negotiation system can include various additional components, such as an infrared emitter in the throw module handset, a pulse monitor in the handset and an intoxication meter in the handset. Further, the command unit includes a camera selector that allows the law enforcement agency to select between the plurality of individual covert video cameras contained in the throw module.

BRIEF DESCRIPTION OF THE DRAWINGS

The drawings illustrate the best mode presently contemplated of carrying out the invention.

In the drawings:

FIG. 4 is a partial perspective view illustrating the position of additional covert video cameras in the throw module of the hostage negotiation system;

FIG. 5 is a perspective view of a handset including an infrared emitter;

FIG. 6 is a perspective view of the command unit of the hostage negotiation system.

DETAILED DESCRIPTION OF THE INVENTION

Figure 1:
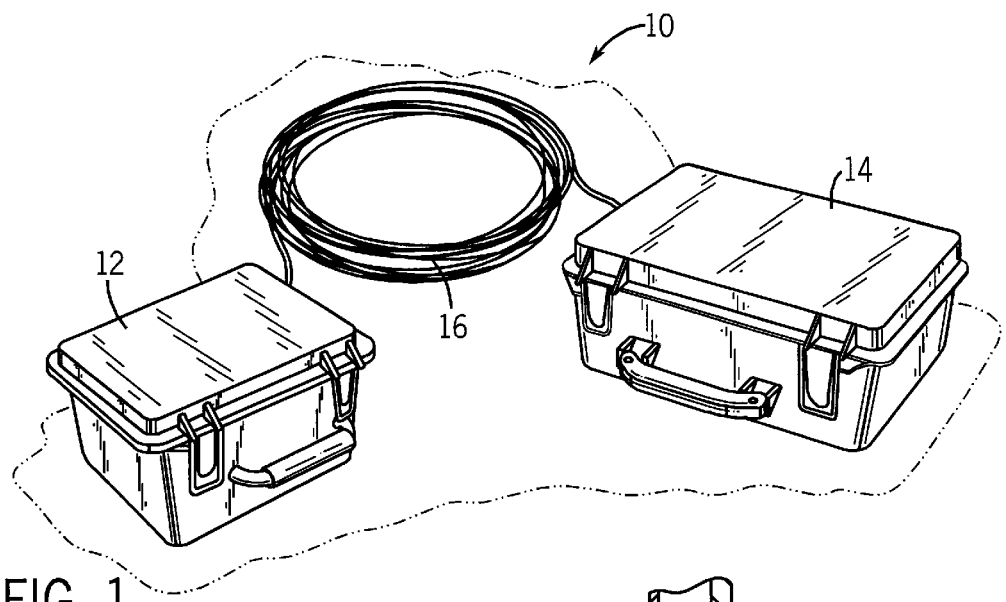
FIG. 1 illustrates a hostage negotiation system of the present invention, including a throw module and a command unit joined by a communication cable.

FIG. 1 illustrates the hostage negotiation system 10 of the present invention. The hostage negotiation system 10 includes a throw module 12 and a command unit 14 preferably joined to one another by a communication cable 16. The communication cable 16 allows the throw module 12 to communicate directly to the command unit 14 without external wiring separate from the hostage negotiation system 10. In use, the throw module 12 is thrown into a building in which hostages are being held or some other type of emergency situation exists. After the throw module 12 has been deployed, the command unit 14 remains outside the building and is used by law enforcement agents to communicate with the extortionist located within the building.

Figure 2:
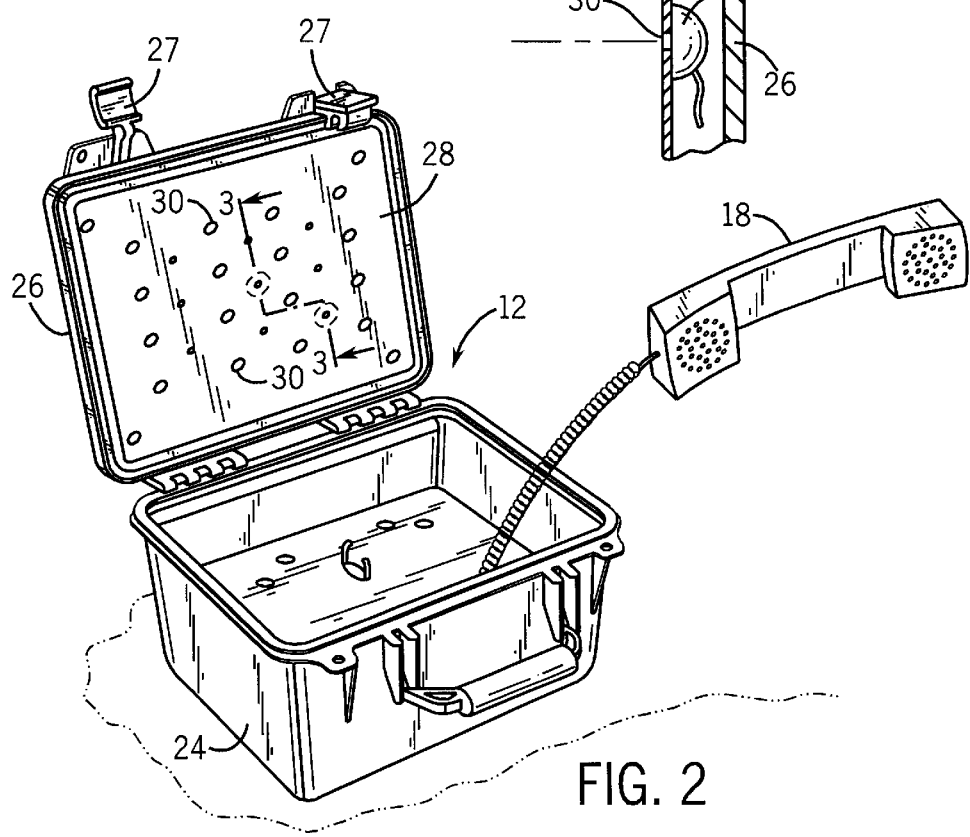
FIG. 2 illustrates the throw module of the hostage negotiation system in the open position.
Figure 7:
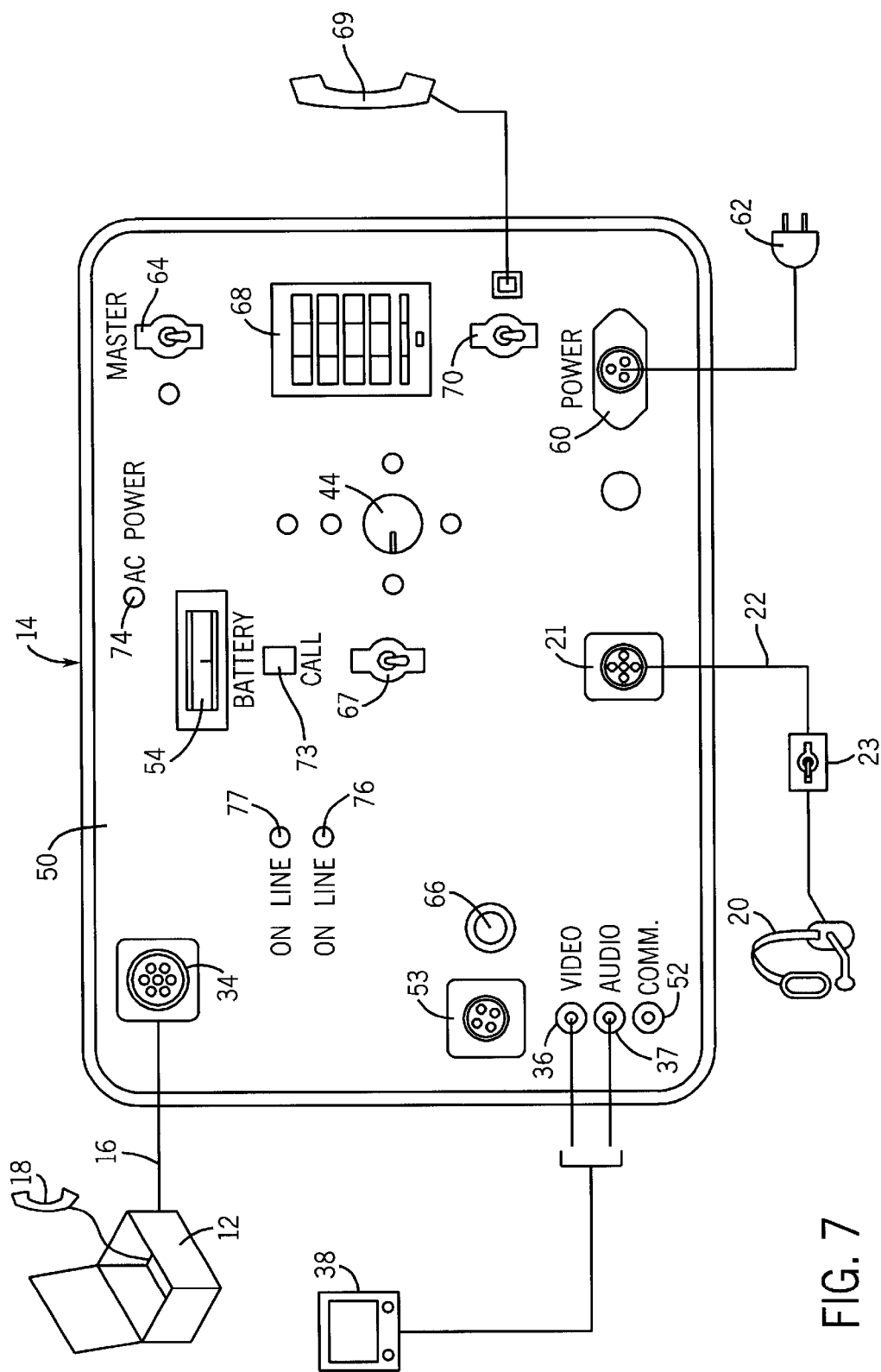
FIG. 7 is a top view illustrating the various controls and indicators on the command unit.

Referring now to FIG. 2, the throw module 12 includes a telephone handset 18, while the command unit 14 shown in FIGS. 6 and 7 includes a hands-free headset 20 joined to a headset port 21 on the command unit 14 by a cord 22. As can be seen in FIG. 7, an on/off switch 23 is positioned between the primary negotiator headset 20 and the command unit 14 that allows the primary negotiator to selectively turn off the microphone on the headset 20 such that the extortionist cannot hear private conversations taking place between the law enforcement agents. In the preferred embodiment of the invention, the headset includes a pair of ear cuffs and a boom microphone to reduce the fatigue of the primary negotiator during extended negotiation periods. Additionally, the headset 20 includes a volume selector that allows the negotiator to control the volume of the headset 20.

In the preferred embodiment of the invention, the communication cable 16 joining the command unit 14 to the throw module 12 is a 100 foot category 5 communication cable, with the possibility of a 400 foot add-on spool to increase the range of the hostage negotiation system 10. Additionally, another spool of cable, having a length of 2000 feet or more, can also be used to extend the range of the hostage negotiation system 10. In the preferred embodiment of the invention, the communication cable 16 includes a length of cut resistant cable near the throw module 12 to prevent the extortionist from severing the communication cable 16.

Referring now to FIG. 2, the throw module 12 of the preferred embodiment includes a rugged, virtually indestructible outer casing having a main body portion 24 and a cover 26.

As can be seen in FIG. 2, the cover 26 includes a pair of latches 27 that secure the cover 26 in the closed position to facilitate throwing of the module 12. The inner surface of the cover 26 includes a generally flat face plate 28 that faces outward when the cover 26 is opened. The face plate 28 includes a plurality of holes 30 spaced along the generally flat surface of the face plate 28.

Figure 3:
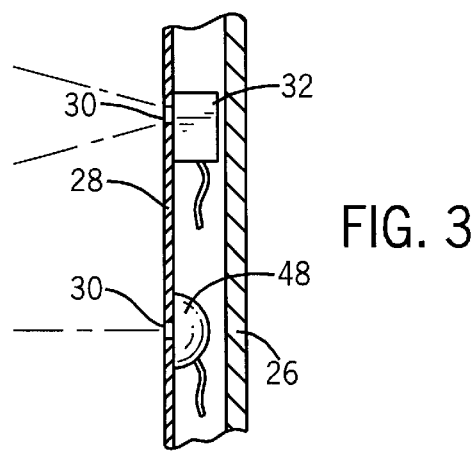
FIG. 3 is a section view taken along line 3—3 of FIG. 2 illustrating the general mounting arrangement of a covert video camera and a covert microphone behind the face plate of the throw module.

Referring now to FIG. 3, in the preferred embodiment of the invention, a covert video camera 32 is positioned behind one of the holes 30 formed in the face plate 28. The numerous holes 30 formed in the face plate 28 aid in deceiving the extortionist as to the presence of the covert video camera 32. When the cover member 26 is opened as shown in FIG. 2, the covert video camera 32 is able to view the area around the throw module 12 and transmit video signals through the communication cable 16 back to the command unit 14.

Referring now to FIGS. 6 and 7, the command unit 14 includes a throw module interface 34 that receives the communication cable 16 joining the throw module 12 to the command unit 14. The command unit receives the video signals from the covert video camera 32 through the communication cable 16 connected to the throw module interface 34.

In addition to the throw module interface 34, the command unit 14 includes a covert video jack 36 and a covert audio jack 37 that can be connected to an external monitor 38 to display the video signals received from the covert video camera 30.

In addition to the single covert video camera 32 mounted behind the face plate 28, it is contemplated by the inventors that a plurality of covert video cameras 32 could be mounted in various walls of the main body portion 24 of the throw module 12, as best shown in FIG. 4. In the embodiment of the invention shown in FIG. 4, a covert video camera 32 is mounted behind each camera opening 42 formed in the side walls of the main body portion 24. Each of the covert video cameras 32 mounted behind one of the side walls of the main body portion 24 faces outward and provides a view of the area surrounding the throw module 12. The plurality of covert video cameras 32 mounted within the main body portion 24 of the throw module 12 in the manner shown, combined with the covert video camera 32 behind the face plate 28, allow the law enforcement agency to have an almost 360° view around the throw module 12 without the extortionist's knowledge.

Referring back to FIGS. 6 and 7, the command unit 14 includes a camera selector 44 that allows the law enforcement agency to select which of the video feeds from the plurality of covert video cameras is displayed upon the monitor 38. Alternatively, all five of the video signals could be simultaneously displayed on a single monitor screen by using a signal splitter. In a system having the five separate covert video cameras 32 shown, the law enforcement agency can view the entire area surrounding the extortionist without the extortionist's knowledge.

In the embodiment of the invention shown in FIG. 7, the command unit 14 is connected to an external monitor 38 through the covert video jack 36 and the covert audio jack 37. It should be understood, however, that it is contemplated by the inventors to include a monitor mounted in the control panel 50 of the command unit 14 such that the entire command unit 14 would be a self-contained unit without the requirement of external components, such as the external monitor 38.

Referring back to FIG. 3, the throw module 12 includes a super high-gain covert microphone 48 mounted behind one of the holes 30 formed in the face plate 28 of the cover 26. As with the covert video camera 32, the covert microphone 48 is mounted behind one of the plurality of holes 30 such that the plurality of holes disguise the location of both the microphone 48 and the video camera 32. The covert microphone 48 functions independently from the handset 18 and picks up sounds in the area surrounding the throw module 12 completely separate from the audio signal being transferred through the handset 18. Through the covert microphone 48, the law enforcement agency using the command unit 14 can monitor discussions and other communication occurring near the throw module 12 without the extortionist being aware that the law enforcement agency can monitor such discussions. Although the covert microphone 48 is shown mounted in the cover 26, the microphone could be hidden in other locations on the throw module 12 while falling within the scope of the invention.

In addition to the video monitor jacks 36 previously discussed, the control panel 50 of the control unit 14 preferably includes a communication port 52 that can be connected to a tape recorder or speaker system to record and monitor conversations with the extortionist or general discussions taking place around the throw module 12.

A general interface port 53 allows all of the video and audio signals to be transmitted away from the command unit 14 to reduce clutter near the command unit 14. The control panel 50 further includes a voltage meter 54 that indicates the current charge of the internal battery contained within the command unit 14.

The command unit 14 further includes a power input terminal 60 that allows the command unit 14 to be coupled to a conventional AC power source by a plug member 62. A DC adapter, not shown, can be connected to the plug 62 such that the command unit can also be powered by a DC power supply. In this manner, the control unit can be powered by either 120 volt AC current or a 12 volt DC external power supply, such as a car battery.

Further, the control panel 50 of the command unit 14 includes a master ON/OFF switch 64, an auxiliary headset port 66 and a headset power switch 67. The auxiliary headset port 66 allows a headset to be connected to the control unit 14 in addition to the headset 20 such that multiple persons can simultaneously communicate or monitor the conversation to the throw module 12. The headset power switch 67 allows the negotiator to turn off the microphone in his headset such that the extortionist cannot listen in on private conversations taking place near the command unit 14.

The control panel 50 further includes a conventional telephone dialing pad 68 and a telephone handset 69 that allows the command unit 14 to be connected to a conventional land wired telephone system such that the command unit 14 can communicate with the extortionist through a conventional telephone system that may be in the building in which the extortionist is located. The use of the conventional telephone touch pad 68 and handset 69 is controlled by a selector switch 70 that allows the law enforcement agency to select between the connection to the conventional telephone system or use of the communication cable 16 joined between the throw module 12 and the command unit 14. Although the control panel 50 is shown as having a separate dialing pad 68 and a telephone handset 69, it is contemplated by the inventors that the dialing pad 68 and telephone handset 69 could be combined.

In addition to the external power supply, the command unit 14 includes an internal battery that allows the command unit 14 to operate independently of any external power source. The internal battery contained within the command unit 14 typically stores enough power to operate the system for several hours without recharging. During use of the hostage negotiation system with an external power supply, the internal batteries within the command unit 14 are automatically recharged. The command unit 14 supplies power to the throw module 12 through the communication cable 16, such that the components contained within the throw module 12 are powered by the command unit 14.

Referring now to FIG. 5, the handset 18 of the throw module 12 is shown including an infrared emitter 72 that functions as a source of infrared light. The infrared light is highly visible by law enforcement agents utilizing conventional night vision scopes or lenses such that during a night time situation, law enforcement agents can view the extortionist without the extortionist realizing there is a source of infrared light present. In addition to the infrared emitter 72, it is contemplated that the handset 18 could include a pulse monitor and/or an intoxication meter. The intoxication meter and pulse monitor would allow the law enforcement agency at the command unit 14 to monitor both the blood alcohol content of the extortionist and his or her pulse rate. The pulse rate indicates the amount of stress the extortionist is under, while the blood alcohol content indicates the degree of sobriety of the extortionist.

The throw module 12 and the command unit 14 both include a "call" button 73. To call the other party, the "call" button is depressed several times. This depression of the "call" button causes the opposite handset to beep. To listen to a conversation, the extortionist simply picks up the telephone handset and listens. To speak to the command unit, the extortionist simply speaks into the microphone in the telephone handset.

The method of using the hostage negotiation system 10 of the present invention will now be described. Before the throw module 12 is given to the extortionist, the 100 feet of communication cable 16 is first attached to the throw module 12. The 100 feet of cable would include the cut-resistant section as previously discussed. After the 100 foot section of cable is attached to the throw module 12, the opposite end of the cable is attached to another 400 feet of cable that is wound upon a separate spool by connecting the male/female adapter plugs. After the two sections of cable are connected, the 400 foot spool of cable is unwound until it reaches the law enforcement command post located externally from the hostage situation. The opposite end of the 400 foot cable is then attached to the black command unit 14 by plugging the adapter plug into the throw module interface 34 on the control panel 50 of the command unit 14. Once the command unit 14 and throw module 12 are connected by the communication cable 16, the hostage negotiation system 10 is ready for use.

The control panel 50 of the command unit 14 includes a variety of indicators and dials to provide feedback to the user. These indicators and dials include: a green light 74 that illuminates when AC/DC power is on, a red light 76 that illuminates when power for the covert video and covert audio is on, a green light 77 that illuminates when the extortionist is on-line, and the voltage meter 54 that indicates when the internal batteries are low. The internal batteries of the control unit 14 are used to operate both the throw module 12 and control unit 14. If the internal batteries fall below a minimum threshold value, the user must recharge the internal batteries. In the preferred embodiment of the invention, the internal batteries can be recharged in a relatively short time period, even when the hostage negotiation system 10 is in use.

In addition to the indicators and dials mentioned above, control panel 50 includes the covert video (CV) port 36. The covert video port 36 permits connection between the command unit 14 and the "video in" jack on a TV monitor, VCR or other video component. This allows police to view video delivered by the hidden cameras in the throw module 12. The communication port 52 can be connected by means of a cable to the "audio in" jack in a tape recorder, speaker, monitor, VCR, etc. This allows police to listen to the conversations occurring over the telephone handsets 18 and 20 between the negotiator and the extortionist. The covert audio (CA) port 37 allows the command unit 14 to be connected to the "audio in" jack on a tape recorder, monitor, VCR, etc. This allows police to listen to conversations occurring in the extortionist's area that are picked up by the hidden microphone 48 located in the throw module 12. The covert audio picks up noise/conversations in the extortionist's area even when the telephone handset is not in use.

Once the command unit 14 and throw module 12 are properly connected by the communication cable 16, the user inserts an AC plug 62 into the AC power source. If desired, a DC adapter can be used to allow the command unit 14 to be powered by a DC power source, such as an auto cigarette lighter. Once power is supplied, the covert video port 36, phone audio port 52, and covert audio ports 37 are connected to the desired electronics enabling both video and audio received by the covert microphone 48, covert video cameras 32, and telephone handsets to be electronically stored on a suitable media. Once the ports are properly connected, the master power switch 64 is depressed to activate the covert audio and video. When activated, the red light 76 on the control panel 50 will illuminate, indicating that covert audio and video are functioning. Once operating, the top cover 26 of the throw module 12 is opened to determine whether the covert video camera 32 is operating properly. Additionally, without using the telephone handset 18, the user generates a sound in a normal voice to assure that the covert audio microphone 48 is operating properly. Next, both the handset 18 and the headset 20 are operated to assure proper operating functions for the hostage negotiation system 10.

After the hostage negotiation system 10 has been properly tested, the throw module 12 is delivered to the desired location. In the preferred embodiment of the invention, the throw module 12 includes rubber shock absorbers located on the outside corners of the throw module 12 to protect the throw module 12 if it is thrown through a window or door.

Once the throw module 12 is in the building occupied by the extortionist, the call button 73 on the command unit 14 is activated to cause the throw module 12 to beep, thereby indicating to the extortionist that an incoming call is being received. In an alternate embodiment of the invention, the throw module 12 can include a light that flashes to indicate that an incoming call has been received by the throw module 12.

Once the extortionist notices the incoming call, the extortionist opens the cover member 26 of the throw module 12 and picks up the handset 18 to speak with the law enforcement agent at the command unit 14. Once the cover member 26 has been opened, both the covert audio and covert video systems included in the throw module 12 relay covert audio and covert video signals to the command unit 14 through the communication cable 16. Additionally, the other features included in the throw module, such as the intoxication meter and pulse monitor, relay information to the command unit 14.

In addition to the features discussed above, it is contemplated that the hostage negotiation system 10 can include all or combinations of the below listed features:

Computer Interface—A computer may interface with the command unit 14 through the interface 53 such that the hostage negotiation system 10 can be linked to a computer mainframe. Police can then access their database for information on the suspect shown by the covert video camera.

Printer Capability—Connection on the command unit 14 that allows the command unit 14 to print video images from the throw module 12. Pictures of the suspect, hostages, and the room layout can be given to the SWAT Team and Perimeter Team to help them should they decide to make a forced entry.

Radio Frequency (wireless)—Allows the hostage negotiation system 10 to transmit video and audio signals via radio waves. Eliminates the need for a communication cable 16. Preferably capable of transmitting up to 2500 feet.

Surround Video—A plurality of cameras are positioned in the throw module 12 that allows officers to see in any direction from the throw module 12. Surround video allows officers to see a complete layout of the room, as well as all the hostages and the suspects in the room.

Infrared—Covert IR emitters 72 contained in the handset 18 or other location on the throw module 12 give officers the ability to view the covert video, even in complete darkness.

Additional Phones on "Command" Side—Connections on command unit 14 allow up to four phones to be used at any time. Enables other individuals to listen to phone conversations between the negotiator and the extortionist. Additional persons could be another negotiator, psychiatrist, commanding officer and so on.

Interpreter Software—Contemplated feature that makes use of language translation software to give officers the ability to communicate with suspect who speaks little or no English.

Antenna—Permits further transmission of radio frequency option on the 2500 foot limitation. Works by means of a covert antenna built into the throw module 12.

Satellite Link—Allows officers to link to GPS (global positioning system) software. Ties into cellular phone and other communication methods. Works via components located in both the throw module 12 and command unit 14.

Land Line Connection—Allows the command unit 14 to connect to existing "normal" telephone lines. Available only to the command unit such that police can make a connection to allow negotiators to connect to a third party, such as a family member of the extortionist.

Locking Device for Cover of Throw Module—Throw module 12 includes arms which lock the cover of the throw module 12 in the open position. The locking arms keep the cover open and allow officers to continue to view the suspect via the covert video lens.

Communication Cable Markings—The cable connecting the throw module 12 and command unit 14 marked in increments. These increments permit officers to better ascertain the suspect's position in the room, distance from the doorway or windows, etc., which helps the SWAT Team should a forced entry be necessary.

AC/DC Power Connections—Allows the command unit 14 to be operated by either a 120 volt AC supply or a 12 volt DC supply.

Voltage, Signal and Battery Indicators—Contained on the control panel 50 of the command unit 14 to allow the officer feedback on the working status of all options, such as battery power, covert video, covert audio, etc.

Screen Splitter—Allows the officer to simultaneously view all cameras positioned in the throw module 12.

Color Camera Video—Replaces the covert video camera with a color video camera.

Ringer/Bell with Light—Located on the throw module 12, notifies suspect of incoming call from the command unit. This is helpful if the cover 26 of the case is closed, and the suspect is not able to hear the phone handset 18 ringing.

Intoxication Meter—An electronic intoxication meter built into the handset 18 of the throw module 12 transfers data to the command unit 14 through the communication cable 16. Breathalyzer gives the negotiator an idea of the suspect's intoxication status to help the negotiator understand suspect's mental status during hostage stand-off.

Pulse Monitor—A conventional electronic pulse monitor built into the handset 18 of the throw module to transfer information related to the extortionist's pulse rate, thereby indicating the relative stress level of the extortionist.

Intercom—Provides a private line with no ability for interference from other sources. Closed, secure, two-way communication managed by the police. Negotiators have to use "normal" telephone lines, they have often had problems with the suspect calling friends and/or family and tying-up the lines. They have also had problems with radio stations or news reporters calling the suspects and tying-up the lines.

On/Off Switch for Video/Audio Signal—Allows negotiator the ability to separately control the covert video and audio.

Hands-Free Headsets—Replaces the telephone handset with a hands-free headset. Relieves tension and fatigue of negotiator, and frees his hands for note taking. The headset can be connected to the control panel 50 through either the headset port 21 or the auxiliary headset port 66.

Tape Recorder—Built-in tape recorder in the command unit 14 gives officers the ability to tape record all conversations with the suspect. Important for legal purposes to protect against law suits. Helpful to police in training purposes. Also helpful during lengthy hostage stand-offs, since negotiators can go back to previous discussions and review them.

Time/Date Stamp—Allows officers to imprint exact time and date video pictures.

Built-In Monitor—Video monitor built into the command unit allows officers to view the covert video. An option for officers that may not have monitors that can be connected to the command unit.

As the above-identified description clearly indicates, the hostage negotiation system 10 of the present invention includes numerous features in addition to the telephone communication between the throw module 12 and the command unit 14. These features, many of which are covert, allow the negotiator to monitor the extortionist without the knowledge of the extortionist. In this manner, the law enforcement officials can make better decisions to aid in ending the hostage situation.

Various alternatives and embodiments are contemplated as being within the scope of the following claims particularly pointing out and distinctly claiming the subject matter regarded as the invention.

I claim:

1. A hostage negotiation system comprising:
   a throw module including a first communication device;
   a command unit connected to the throw module by a communication cable separate from a commercial landwire telephone system, the command unit including a second communication device such that the first communication device communicates with the second communication device through the communication cable, the command unit including an internal battery and an external power connection for powering both the throw module and the command unit;
   a plurality of covert video cameras concealed in the throw module, the covert video cameras each positioned to record and transmit a separate video signal from the throw module to the command unit; and a covert microphone concealed within the throw module for receiving and transmitting an audio signal from the throw module to the command unit.

2. The hostage negotiation system of claim 1 wherein the throw module includes a main body portion having a generally rectangular configuration formed by a plurality of joined sidewalls, the hostage negotiation system further comprising a covert video camera positioned within each of the plurality of sidewalls, each covert video camera positioned to record and transmit a video signal from the throw module to the command unit.

3. The hostage negotiation system of claim 2 wherein the command unit includes a camera selector to select between the video signals transmit to the command unit by the plurality of covert video cameras.

4. The hostage negotiation system of claim 1 further comprising an infrared emitter mounted to the first communication device contained on the throw module, the infrared emitter generating infrared light.

5. The hostage negotiation system of claim 1 wherein the command unit includes a covert audio output port and a covert video output port such that the video signal received from the covert video camera and the audio signal received from the covert microphone are displayed and transmit to an external monitor through the covert audio port and the covert video port.

6. The hostage negotiation system of claim 1 wherein the covert video camera is concealed behind a face plate connected to a cover of the throw module, the covert video camera being positioned behind an access hole formed in the face plate.

7. The hostage negotiation system of claim 6 wherein the covert microphone is positioned behind the inner face plate attached to the cover of the throw module, the covert microphone being positioned behind an access hole formed in the face plate.

8. The hostage negotiation system of claim 1 wherein the command unit includes an external telephone cord and a dialing pad such that the command unit can be connected to a commercial land-wired telephone system.

9. The hostage negotiation system of claim 1 wherein the first communication device is a telephone handset and the second communication device is a hands-free headset.

10. The hostage negotiation system of claim 9 further comprising an on/off switch positioned between the headset and the command unit, the on/off switch being operable to selectively turn off a microphone contained in the headset.

11. A hostage negotiation system comprising:

a throw module having a cover member and a generally rectangular main body portion formed from a plurality of sidewalls, the throw module further including a first communication device;

a command unit connected to the throw module by a communication cable separate from a commercial land-wire telephone system, the command unit including a second communication device such that the second communication device can communicate with the first communication device through the communication cable;

a plurality of covert video cameras concealed in the throw module, each covert video camera positioned to record and transmit a video signal from the throw module to the command unit; and a covert microphone concealed in the throw module for receiving and transmitting an audio signal from the throw module to the command unit.

12. The hostage negotiation system of claim 11 wherein one of the covert video cameras is concealed behind a face plate attached to the cover of the throw module.

13. The hostage negotiation system of claim 12 wherein a covert video camera is concealed within each side wall forming the main body portion of the throw module.

14. The hostage negotiation system of claim 12 wherein the command unit includes a camera selector such that the command unit can select between the plurality of video signals transmit to the command unit by the covert video cameras.

15. The hostage negotiation system of claim 14 wherein the command unit includes a covert video jack and a covert audio jack, the covert video jack and the covert audio jack providing a connection for an external monitor to display the audio signal and video signal received from the throw module.

16. The hostage negotiation system of claim 11 wherein the first communication device is a telephone handset and the second communication device is a headset.

17. The hostage negotiation system of claim 16 further comprising an on/off switch positioned between the headset and the command unit, the on/off switch being operable to selectively turn off a microphone contained in the headset.

18. The hostage negotiation system of claim 11 wherein the command unit includes an internal battery used to operate the plurality of covert video cameras and the covert microphone contained in the throw module.

19. The hostage negotiation system of claim 18 further comprising an external power supply port contained on the command unit, the external power supply port receiving a supply of external power to charge the internal battery contained within the command unit and operate the plurality of covert video cameras and the covert microphone contained in the throw module.

* * * * *